United States Patent

[11] 3,631,881

[72] Inventor Hoel L. Bowditch
    Foxboro, Mass.
[21] Appl. No. 864,108
[22] Filed Oct. 6, 1969
[45] Patented Jan. 4, 1972
[73] Assignee The Foxboro Company
    Foxboro, Mass.
    Continuation-in-part of application Ser. No. 772,601, Nov. 1, 1968, now abandoned. This application Oct. 6, 1969, Ser. No. 864,108

[54] PNEUMATIC INTERCONNECTION BOARD
    34 Claims, 10 Drawing Figs.
[52] U.S. Cl............................................. 137/271,
    29/157.3, 113/116, 137/608, 138/111
[51] Int. Cl............................................. F15c 5/00,
    F15c 1/06, F15c 3/04
[50] Field of Search........................................ 137/608,
    81.5, 271; 138/115, 116, 177, 178, 111; 29/157.3
    D; 113/116

[56] References Cited
UNITED STATES PATENTS

| | | | |
|---|---|---|---|
| 3,298,460 | 1/1967 | Porter et al. | 184/7 |
| 3,384,115 | 5/1968 | Datzan et al. | 137/608 |
| 3,407,833 | 10/1968 | Brandenberg | 137/271 |
| 3,407,846 | 10/1968 | Brandenberg | 137/608 |
| 2,882,588 | 4/1959 | Rieppel et al. | 29/DIG. 32 |
| 2,920,463 | 1/1960 | Gould | 29/DIG. 32 |
| 2,944,328 | 7/1960 | Adams | 29/DIG. 32 |
| 3,018,543 | 1/1962 | Beck | 113/118 X |

Primary Examiner—M. Cary Nelson
Assistant Examiner—Robert J. Miller
Attorney—Bryan, Parmelee, Johnson & Bollinger ABSTRACT: A laminated board made of two sheets of aluminum and providing closed conduits for transmitting fluid pressures between pneumatic components secured to the board. One sheet is press-formed to provide groovelike channels; the other sheet is sealed to the first sheet and is formed with connection holes leading to the passages defined by the press-formed channels. The two sheets are bonded together by an epoxy preform having a configuration matching that of the circuit board and sealing the passages from leakage.

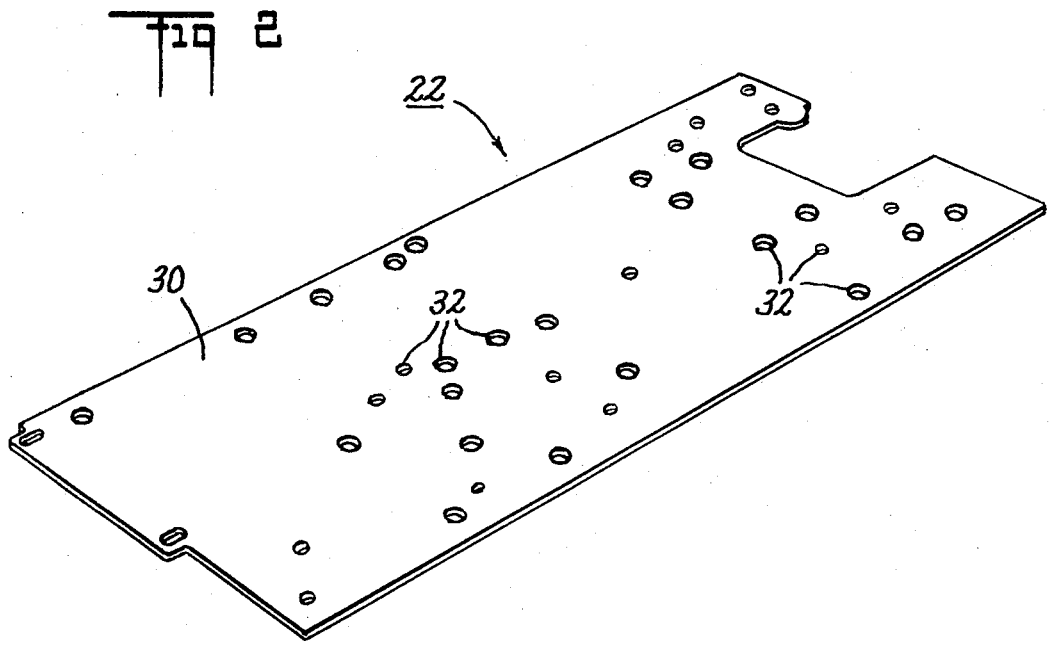
Fig 2
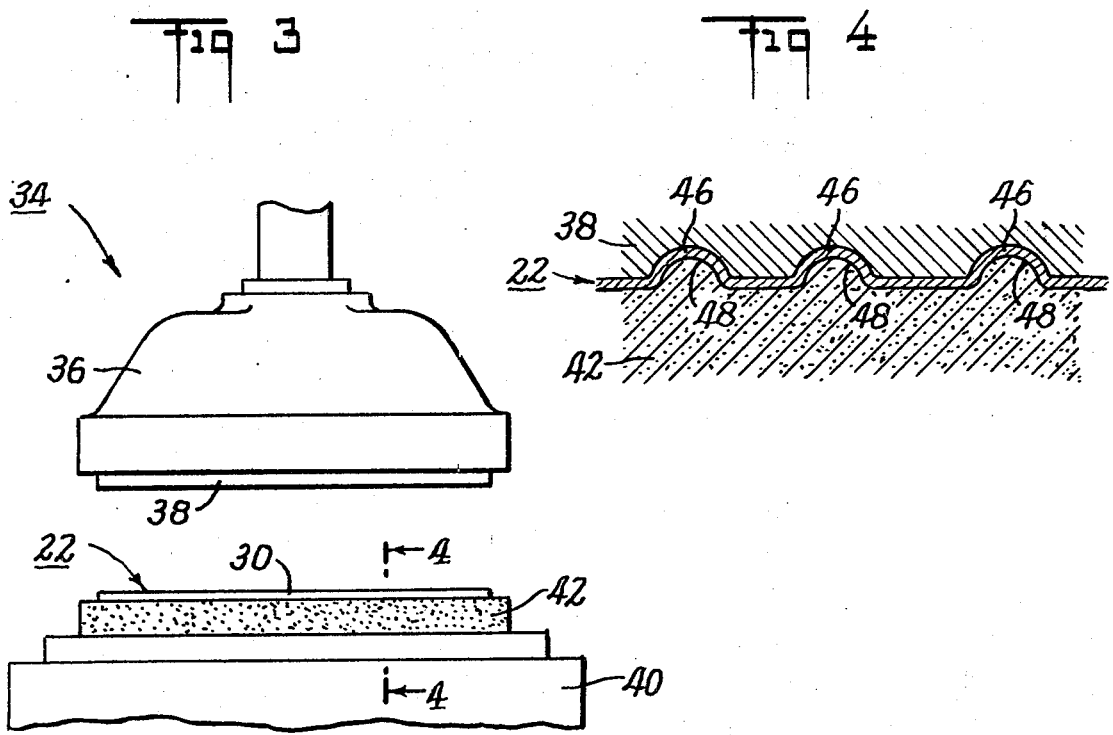
Fig 3
Fig 4

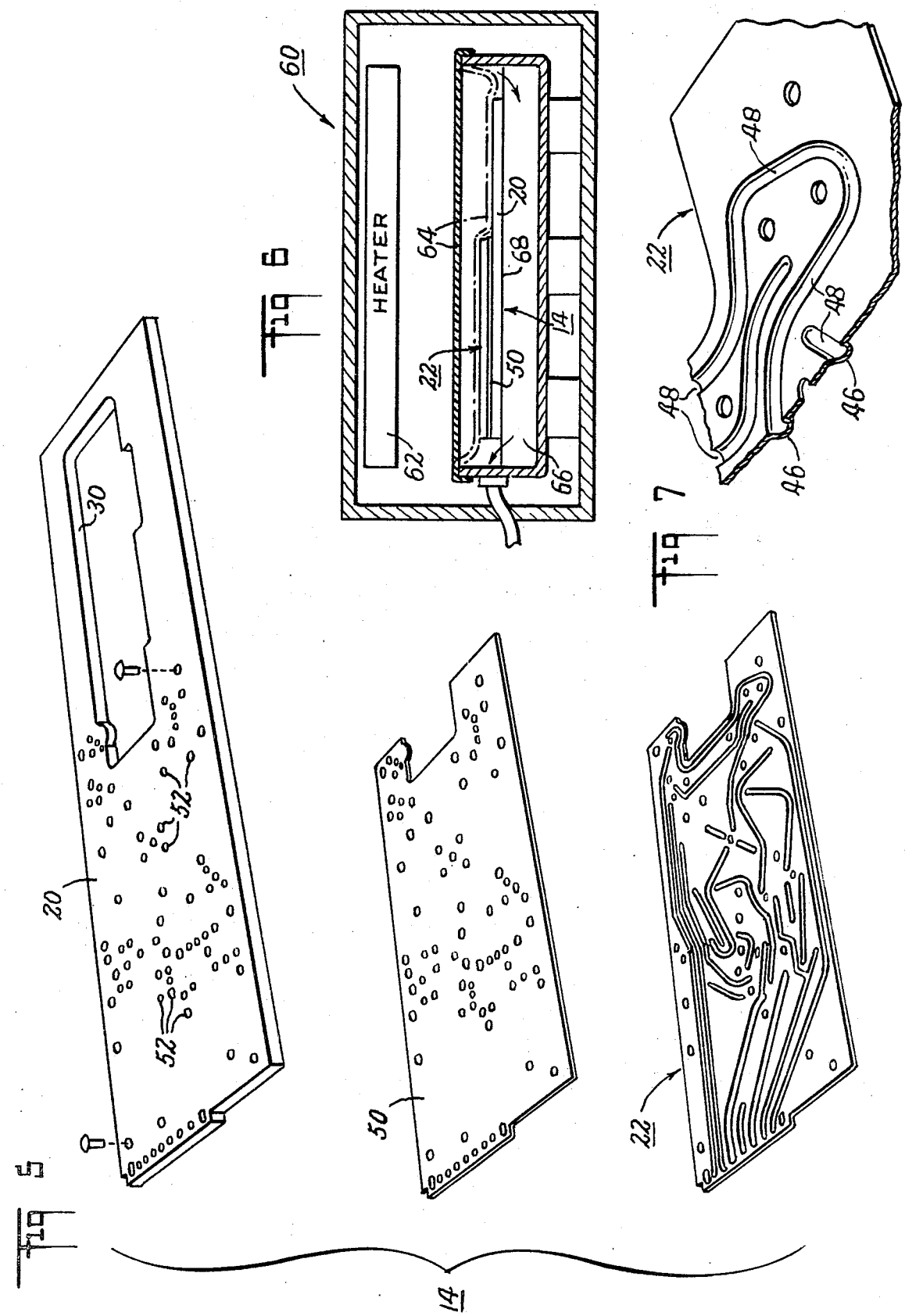

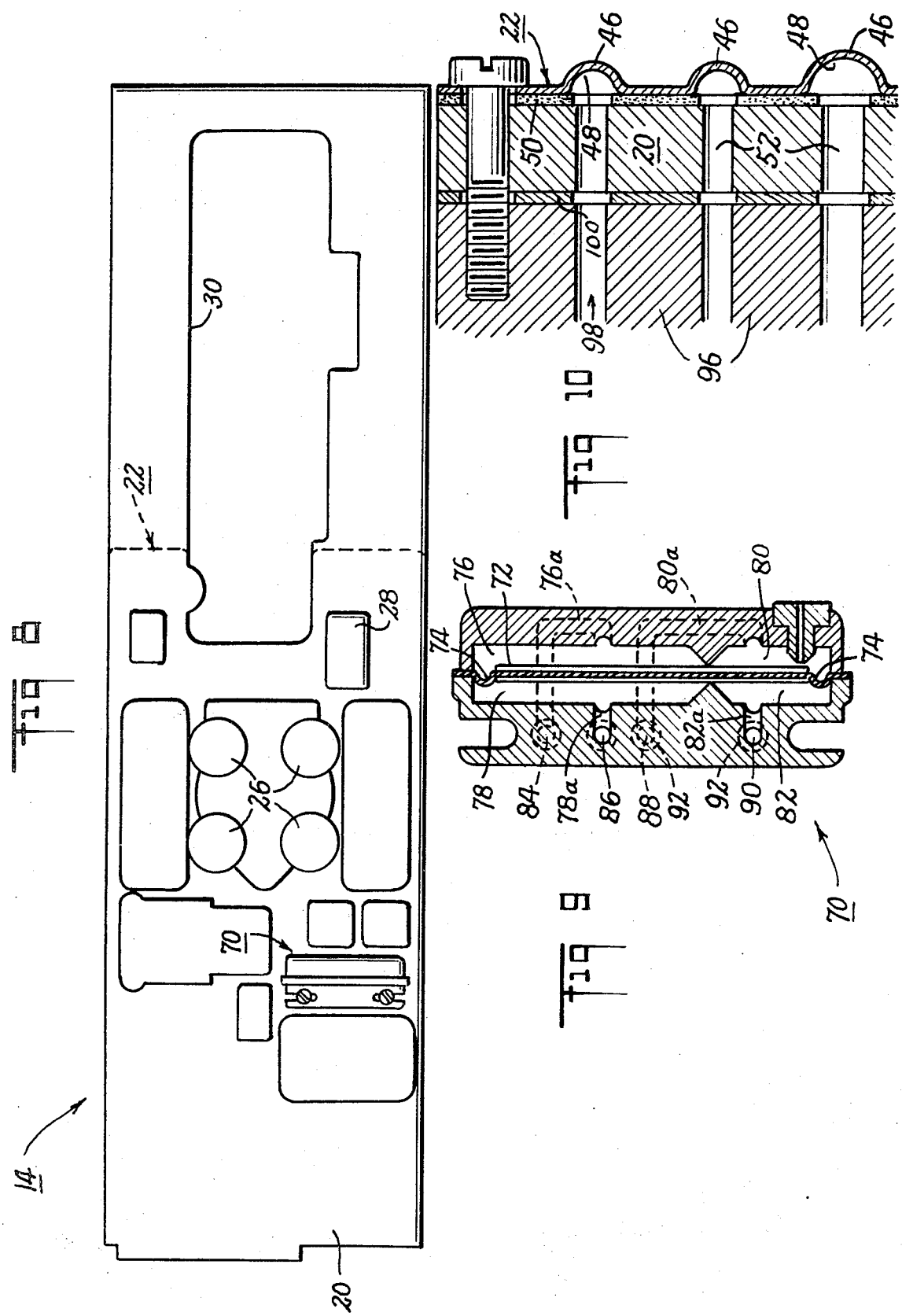

PNEUMATIC INTERCONNECTION BOARD

This application is a continuation-in-part of pending application Ser. No. 772,601, filed on Nov. 1, 1968, and now abandoned.

This invention relates to industrial process instrument systems of the pneumatic type. More particularly, this invention relates to improvements in pneumatically interconnecting the components of such systems.

Pneumatic instruments have been used for many decades with industrial processes to measure and/or control process conditions such as temperature or flow rate. These instruments generally perform a number of different but interrelated functions to effect some desired end result. The functions performed may for example include some combination of the following:

1. producing a motion corresponding to a sensed pressure,
2. developing a pneumatic signal in response to the degree of unbalance between two opposed forces,
3. varying a rebalance force to maintain the forces on an element in balance,
4. altering a pneumatic pressure signal as a function of its rate-of-change or time-integral,
5. amplifying a pneumatic signal, and so forth. A typical instrument such as a process controller ordinarily contains a number of separate components for accomplishing corresponding functions.

The individual components of a pneumatic instrument must be interconnected in such a way as to transmit fluid pressure signals therebetween to satisfy the system requirements, and connections also of course must be provided to supply air under pressure to such components as require it. Generally these interconnections have in the past been in the form of sealed piping or tubing adapted to conduct fluid under pressure to and from the separate components. Although such arrangements have been functionally effective, they have not been well adapted to economical manufacture, particularly for the more recent highly complex instruments requiring multiple interconnections. The use of conventional tubing and piping also does not lend itself well to the compact instrumentation so essential to the proper instrumenting of modern processes involving large numbers of variables all controlled by instruments clustered at a central station.

In a preferred embodiment of the present invention, to be described below in detail, there is provided a new technique for producing the fluid interconnections required in pneumatic instruments. This new technique comprises the development and use of what might be termed a pneumatic "circuit board" which is manufactured as an integral unit and provides all (or substantially all) of the interconnections needed for the multiple components of a corresponding instrument. This circuit board also may advantageously serve to physically support at least some of the components of the instrument. The circuit board with its components may readily be secured in an instrument by elongate guide rails.

The circuit board of the disclosed embodiment basically comprises two aluminum plates which are bonded together face-to-face by epoxy resin cement provided as a "preform" of impregnated fiberglass. One plate (called the "mounting plate") is planar and rigid but formed with a set of connection holes. The other plate (called the "circuit plate") is pressure-formed with ridgelike elements to define sealed fluid flow passages extending between the connection holes. Such a circuit board can readily be manufactured in quantity and assembled with its associated components by conventional procedures at modest expense, and will provide long periods of trouble-free operation.

Accordingly, it is an object of this invention to provide improved pneumatic instrumentation for use with industrial processes. Another object of this invention is to provide new techniques for interconnecting the individual components of a complex pneumatic instrument. The invention also comprises structural embodiments and methods for making such structures. Other specific objects, advantages and aspects of the invention will in part be pointed out in, and in part apparent from, the following description considered together with the accompanying drawings in which:

FIG. 2 is a perspective of a blanked circuit plate prior to shaping;

FIG. 3 shows a press in which the circuit plate of FIG. 2 is shaped by pressure-forming;

FIG. 4 is a detail section along line 4—4 of FIG. 3, when the press is closed;

FIG. 5 is an exploded perspective of the principal elements of the circuit board;

FIG. 6 shows an oven for curing the bonding cement of the circuit board;

FIG. 7 is an enlarged perspective of a part of the press-formed circuit plate;

FIG. 8 shows a circuit board with typical components mounted thereon;

FIG. 9 is a vertical section through one of the components, looking towards the circuit board; and FIG. 10 is a section along line 10—10 of FIG. 1, to show the connections between the circuit board and the supply and signal conduits.

Figure 1:
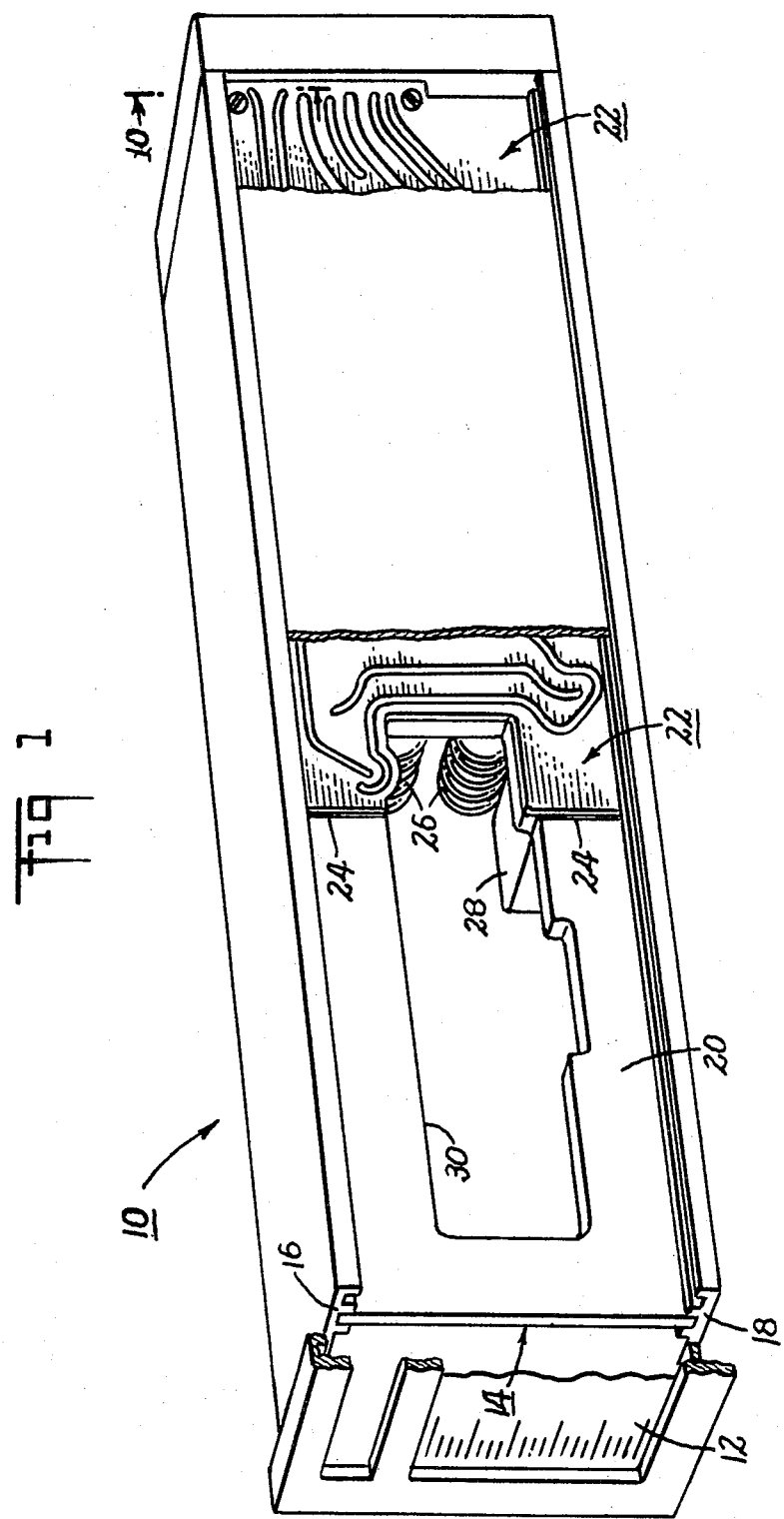
FIG. 1 is a perspective of an instrument including a circuit board in accordance with the present invention.

Referring first to FIG. 1, there is shown in perspective a pneumatic indicating controller 10 of the small case type adapted for high-density panel mounting, such as in a central control station. Such controllers are arranged to receive pneumatic pressure signals, e.g. in the range of 3–15 p.s.i., and to produce corresponding pneumatic control signals for transmission to process valves or other associated units of the system. The instrument may include a front panel indicator 12 to display one or more signal levels for the control station operating personnel.

The controller 10 includes a vertically mounted circuit board, generally indicated at 14, which is supported at its upper and lower edges by guide rails 16 and 18. This circuit board is a laminated sandwich structure consisting of a rigid aluminum mounting plate 20 (extending the full length of the controller) and a circuit plate 22 bonded to the mounting plate by a layer or film of cement 24. Secured to the opposite side of the mounting plate are a number of separate pneumatic components, two of which (26, 28) can be seen through the central opening 30 formed in the particular circuit board disclosed herein to provide mechanical clearance for certain operating elements, not shown herein.

FIG. 2 shows the circuit plate 22 in flat condition, blanked in predetermined geometrical configuration and pierced with a number of holes as at 32. (Note: These holes 32 are for mounting screws and alignment rivets, and do not play any part in the pneumatic passages to be disclosed.) This plate 22 is made of dead soft aluminum, e.g. type 1100–D having a uniform thickness of about 0.015–0.016 inch. After piercing, the plate may be smoothed by the application of pressure from a set of flat dies, to eliminate burrs and collars.

The blanked-out flat plate 22 is placed in a forming press illustrated at 34 in FIG. 3, and which includes an upper reciprocating head 36 carrying a precision female die 38, and a lower support 40 having a resilient male die 42 such as a pad of polyurethane. The female die is formed with a complex pattern of groovelike recesses so that, when the press is closed (FIG. 4), the resilient male die acts somewhat in the nature of a liquid to force the thin aluminum material up into the die recesses. Thus the aluminum plate is pressure-formed with a series of ridges 46 identical in configuration to the recesses of the female die. These ridges define on the opposite sides thereof corresponding lateral grooves 48 extending laterally along the face of the plate (see also FIG. 7).

In press-forming the aluminum plate 22 with such grooves, the aluminum metal is stretched somewhat in the localized regions adjacent the grooves. This stretching of the aluminum can aid in producing the desired flat surfaces between the grooves by a process which can be termed "stretch-leveling," where parts of the original planar sheet portions between the grooves are stretched laterally into the formed passages, causing the remaining intergroove portions to be flattened as the stretching proceeds. That is, such stretching, under pressure from the planar portions of the dies, tends to level the aluminum material, as by removing any crinkles or other surface irregularities. To produce the best results, it is desirable to use a female die presenting relatively large radii of curvature in the groove surfaces.

FIG. 5 shows the pressure-shaped circuit plate 22 together with the mounting plate 20 and a sheet 50 of bonding material used to secure the two plates together.

The mounting plate is relatively thicker than the circuit plate, and provides rigidity for the laminated structure. This mounting plate can be formed by conventional stamping procedures, and is made with a number of holes such as illustrated at 52. Some of these holes are for bolting components in place. Other holes are formed in a pattern adapted to provide communication with grooves 48 when the plates are bonded together.

Prior to assembling the elements of FIG. 5, the aluminum surfaces to be bonded preferably are treated, chemically and/or mechanically, to provide a good adhesion in the subsequent bonding step of the process. The treatment particularly should remove any silicones used during manufacture of the aluminum. The aluminum surfaces may be cleaned by immersion in a solution of sulfuric acid and sodium dichromate, at 155° F., for 10 minutes. Thereafter, the surfaces are rinsed with circulating cold water, followed by a hot water rinse, and hot air drying. The aluminum surfaces may also be treated with commercially available chromate conversion coatings, such as that supplied by The Diversey Corporation, Chicago, Ill., providing a good adherent base, and reducing oxidation problems.

The sheet 50 of bonding material comprises a thin (0.003 inch) fiberglass mat, or matrix, impregnated with B-stage epoxy. This impregnation includes both the epoxy resin and its catalyst, in solid form. The use of a solid bonding material is superior to liquid cement, in its application to the present invention, because it insures uniform thickness of the bonding layer and avoids problems with cement flowing out from between the aluminum plates. The impregnated fiberglass mat may be cut out from a large sheet, as by means of a production blanking die, to provide the cement material as a preform. Satisfactory results have been achieved by dies having a clearance of 0.002 inch which stroke past the die closing point by only 0.010 inch.

Special care preferably should be exercised to assure that moisture is not absorbed into the epoxy preform, e.g., during storage awaiting use. Thus the prepared preforms should be stored with dessicants. When assembling the circuit boards manually, cotton gloves may be worn to avoid introducing moisture. The three elements preferably are mechanically aligned during assembly, as with the aid of alignment rivets inserted through a selected set of the holes formed in the two plates 20 and 22 and in the preform 50. This preform also is cut with additional holes aligned with the pneumatic communication holes in the circuit board.

The assembled laminate is thereafter placed in an oven 60, illustrated schematically in FIG. 6. This oven includes heater means 62 to heat the preform to its curing temperature, e.g. 340° F. Desirably, the rate of temperature rise should be 4° to 8° per minute, and the curing temperature should be maintained for about 10 minutes.

Superior results are achieved by applying uniform pressure to the entire epoxy preform during the curing process. Advantageously, this is accomplished by means of a flexible diaphragm 64 which forms the top of a sealed chamber 66 within which the circuit board structure 14 is placed. During the curing operation, this chamber is evacuated so that atmospheric pressure forces the circuit plate 22 downwardly, with uniform pressure, against the epoxy preform 50. Experience has shown that a pressure of almost 10 p.s.i. produces good results. The alignment rivets of the assembly can serve as standoffs to hold the mounting plate 20 a small distance above the support shelf 68, and insure rapid and uniform evacuation beneath all regions of the mounting plate.

FIG. 8 illustrates the manner in which a variety of components are secured to the outer surface of the mounting plate 20 (the term "outer" is used with reference to the circuit board structure 14, not the instrument per se). These components may, for example, include a set of bellows 26 each of which communicates through a corresponding hole in plate 20 to a respective groove 48 in the circuit plate 22.

FIG. 9 shows the interior of another type of pneumatic component 70 which is especially adapted for use with the new circuit board structure because it provides relatively complex yet precise functions in an extremely small package. This component incorporates a pivotal diaphragm element 72 sealed with a rubber sheet 74 to define two sets of opposed pressure chambers 76, 78 and 80, 82 at opposite sides of the pivot line. These chambers connect through respective passages 76a, 78a; 80a, 82a to holes 84, 86; 88, 90 in the side of the component which is held pressed against the outer surface of the mounting plate 20. These holes are aligned with corresponding holes in the mounting plate to make connection to respective grooves 48 in the circuit plate. This connection may be sealed by conventional gasketing, such as by O-rings 92 between the component 70 and the mounting plate.

FIG. 10 illustrates the manner in which the circuit board structure may be connected to the supply and signal conduits leading to other parts of the system. As can be seen, the end wall of the circuit board is bolted firmly against a chassis member 96 formed with conduits 98 the openings of which are aligned with corresponding holes in the mounting plate. Again, suitable gasketing 100 is provided to effect a proper sealing of the connections.

I claim:

1. For use with pneumatic instruments and the like, a rigid circuit board structure for establishing pneumatic interconnections between components of the instrument, said circuit board structure comprising:
    a first plate of relatively thin, formable material of at least approximately uniform thickness, said first plate being pressed out in selected regions to form a predetermined complex pattern of ridgelike elements defining on the opposite sides thereof grooves extending laterally along the plate;
    a second plate abutting said first plate in face-to-face relationship and cooperating with said grooves to establish closed passageways for the transmission of gaseous fluid under pressure; and
    means bonding said two plates together to produce a composite laminated sandwich providing pressuretight sealing of said passageways, one of said plates being formed with openings communicating through said one plate at least to certain of said passageways to provide for connection to a component of the instrument.

2. A structure as claimed in claim 1, wherein said first plate is stretch-formed with said ridges and said second plate is formed with said openings communicating with said passageways.

3. A structure as claimed in claim 2, including at least one pneumatic component secured to said second plate and positioned over at least one of said openings to establish communication therewith.

4. A structure as claimed in claim 3, wherein said first and second plates are made of metal; said second plate being thicker than said first plate to provide structural rigidity for the circuit board.

5. A structure as claimed in claim 4, wherein said two plates are made of aluminum.

6. A structure as claimed in claim 1, wherein said bonding means comprises a fabric matrix impregnated with a bonding cement.

7. A structure as claimed in claim 6, wherein said two plates are made of aluminum; said bonding cement comprising epoxy.

8. A structure as claimed in claim 7, wherein said fabric matrix is a preform of fiberglass.

9. The method of pneumatically interconnecting the components of a pneumatic instrument, comprising the steps of:
   pressure-forming a first plate of relatively soft and formable material to develop a complex pattern of ridgelike elements defining on the opposite sides thereof grooves running laterally along the face of the plate;
   positioning a second plate in abutting face-to-face relationship with respect to said first plate to form with said grooves a corresponding series of fluid passageways;
   bonding said two plates together to effect a pressuretight seal for the passageways and to produce a composite laminate structure; and
   mounting said components on at least one of said plates in communication with said passageways in a predetermined interconnection pattern.

10. The method of claim 9, wherein said first plate is made of thin aluminum.

11. The method of claim 10, including the step of cleaning the surface of said aluminum plate and applying thereto a conversion coating.

12. The method of claim 11, wherein said bonding is produced by a resin cured at relatively high temperature.

13. The method of claim 12, wherein said bonding is produced by an epoxy preform inserted between said two plates and cured under pressure.

14. The method of making a structure for supporting and pneumatically interconnecting components of an instrument for industrial processes, comprising the steps of:
   pressure-forming a first planar plate of relatively soft and formable metal with a predetermined pattern of lateral grooves;
   forming a second planar plate of metal with holes in a predetermined arrangement corresponding to said predetermined pattern of grooves to permit connection to be established thereto when the two plates are assembled;
   assembling said two plates together with an intermediate sheet of resin cement; and
   activating said resin to bond together said two plates whereby said grooves become sealed passageways for conducting pneumatic pressure signals to or from components mounted on said second planar plate.

15. The method of claim 14, wherein said sheet of resin cement is first blanked out in a geometrical configuration corresponding to that of said first plate.

16. The method of claim 15, wherein said sheet is a fabric matrix impregnated with a resin and a catalyst.

17. The method of claim 14, wherein said two plates are made of aluminum.

18. The method of claim 17, wherein said first plate is stretch-leveled to flatten its bonding surface.

19. The method of claim 17, including the step of piercing the first plate with alignment holes, and thereafter flattening said first plate to assure good bonding.

20. The method of claim 17, including the step of stamping said second plate to form a geometrical configuration corresponding to said first plate.

21. For use with pneumatic instruments and the like, a unitary circuit board assembly comprising a support panel, and a circuit panel mounted in lamination form on said support panel, said circuit panel having therein pneumatic passage grooves facing internally of said assembly against said support panel whereby said support panel completed said grooves into sealed passageways, and openings in said circuit board assembly communicating with said passageways as means for interconnecting instrument components without the use of conventional interconnecting piping or tubing, said assembly being in the form of a panel, edge mounted, top and bottom, in guide rails provided therefor in an instrument housing.

22. A circuit board assembly according to claim 21, wherein said guide rails are provided at one side of said instrument housing.

23. A circuit board assembly according to claim 21, wherein said assembly comprises an elongate support panel, with an element clearance opening therethrough at one end thereof, and a short circuit panel, sandwiched to said support panel at the other end thereof.

24. A circuit board assembly according to claim 21, wherein said openings in said circuit board comprise passages through said support panel, with certain of said openings being located at one end of said assembly for placement at the rear of the instrument for introducing supply pressures to said assembly, and exiting signal pressures therefrom, the remainder of said circuit board openings other than holes for mounting screws and alignment rivets, comprising pneumatic passage leads to, from, and between instrument components to be mounted on said circuit board assembly.

25. A circuit board assembly according to claim 21, wherein said circuit panel pneumatic passage grooves are distributed throughout said panel in appearance like a scattering of dead-ended worm-tunnels, except for the access passages provided by said openings in said circuit board assembly communicating with said grooves.

26. A pneumatic circuit board instrument assembly comprising a narrow rectangular housing comprising top and bottom internally grooved guide rails, sidewall members mounted in certain of the grooves of said top and bottom guide rails, a laminated circuit board assembly mounted in others of the grooves of said guide rails, a rear wall unit provided with pneumatic access passages to said circuit board assembly, and a front wall unit as an indicator panel for said instrument assembly.

27. An instrument assembly according to claim 8, wherein said circuit board assembly comprises a support panel, and a circuit panel mounted in lamination form on said support panel, said circuit panel having therein various pneumatic passage grooves facing internally of said assembly against said support panel whereby said support panel completes said grooves into sealed passageways, and openings in said circuit board assembly connecting with said passageways as a means for interconnecting instrument components without the use of conventional interconnecting piping or tubing.

28. The circuit board structure of claim 1, wherein said second plate is substantially thicker than said first plate to provide structural strength assuring the rigidity of the circuit board.

29. The circuit board structure of claim 28, wherein both of said plates are made of aluminum.

30. The circuit board structure of claim 29, wherein the bonding material is restricted to the regions between the passageways, so that the passageways are free of bonding material.

31. For use with fluid-operated devices such as pneumatic instruments and the like, a circuit board assembly for establishing fluid interconnections between instrument components mounted and supported on the circuit board, said assembly comprising:
   a first plate of relatively thin material formed in selected regions with a predetermined complex pattern of ridgelike elements defining on the opposite sides thereof grooves extending laterally along the plate;
   a second plate having substantially greater structural strength than said first plate and providing rigidity for the assembly, said second plate abutting said first plate in face-to-face relationship and cooperating with said grooves to establish closed passageways for the transmission of fluid under pressure;
   means bonding said two plates together to produce a composite laminated sandwich providing pressuretight sealing of said passageways; and
   at least one fluid-operated instrument component mounted on said circuit board structure;
   said circuit board structure being formed to provide fluid connection between said one instrument component and at least one of said passageways.

32. The circuit board structure of claim 31, wherein said one component is mounted directly on said second plate.

33. The circuit board assembly of claim 31, wherein said component includes a fluid pressure chamber having as one wall thereof a thin planar element responsive to fluid pressures, said chamber being connected through said circuit board structure to said one passageway.

34. The circuit board assembly of claim 31, wherein both of said plates are formed of aluminum sheets, said first plate of relatively thin aluminum being pressed-formed with ridgelike elements, the other plate being formed with openings to effect fluid communication between said one passageway and said instrument component, said component being mounted directly on said second plate.

* * * * *